INVENTORS:
F.C. WILLIAMS
T. KILBURN
H.J. CRAWLEY
ATTORNEYS:
Moore and Hall

INVENTORS:
F. C. WILLIAMS
T. KILBURN
H. J. CRAWLEY
ATTORNEYS:
Moore and Hall

March 11, 1958 F. C. WILLIAMS ET AL 2,826,715

ELECTRONIC STORAGE OF INFORMATION

Filed Sept. 5, 1951 6 Sheets-Sheet 3

INVENTORS:
F.C. WILLIAMS
T. KILBURN
H.J. CRAWLEY
ATTORNEYS:
Moore and Hall

March 11, 1958 F. C. WILLIAMS ET AL 2,826,715

ELECTRONIC STORAGE OF INFORMATION

Filed Sept. 5, 1951 6 Sheets-Sheet 4

INVENTORS:
F.C. WILLIAMS
T. KILBURN
H.J. CRAWLEY
ATTORNEYS:
Moore and Hall

ELECTRONIC STORAGE OF INFORMATION

INVENTORS:
F. C. WILLIAMS
T. KILBURN
H. J. CRAWLEY
ATTORNEYS:
Moore and Hall

INVENTORS:
F.C. WILLIAMS
T. KILBURN
H.J. CRAWLEY
ATTORNEYS:
Moore and Hall 2,826,715
Patented Mar. 11, 1958

2,826,715

ELECTRONIC STORAGE OF INFORMATION

Frederic Calland Williams, Timperley, Tom Kilburn, Davyhulme, Manchester, and Hubert J. Crawley, London, England, assignors to National Research Development Corporation, London, England Application September 5, 1951, Serial No. 245,116

Claims priority, application Great Britain September 25, 1950

16 Claims. (Cl. 315—12)

Figure 1:
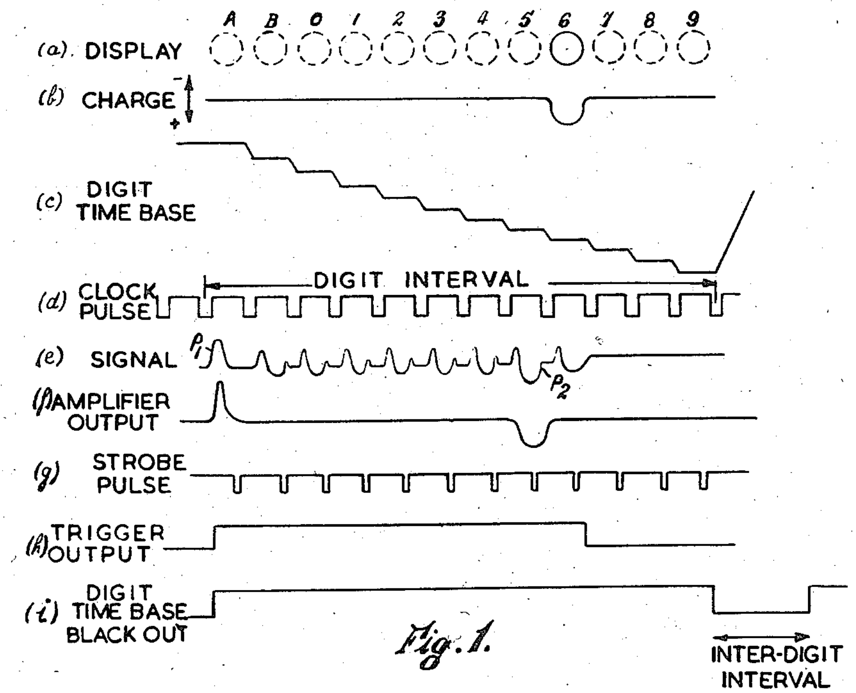

The present invention relates to the storage of numerical information, using an electrostatic storage system of the kind in which a cathode ray beam is caused to explore areas of a surface of an insulating screen, and to liberate secondary electrons from these areas, these secondary electrons being collected by a collecting electrode whereby the areas become charged, in which changes of charge produced by a subsequent exploration of the areas develop in a signal plate associated with the screen voltages representative of the stored information, and in which these voltages are applied to cause regeneration of the charges upon the respective areas.

Examples of this system of storage, which is adapted primarily for the storage of binary-digital information, i. e. numerical information in the radix notation with the base 2, are described, for example, in the specifications of co-pending U. S. pat. applns. Serial Nos. 790,879, filed December 10, 1947, 50,136, filed September 20, 1948, 124,192, filed October 28, 1949, 205,459, filed January 11, 1951, and now Patent No. 2,642,550, issued June 16, 1953, and 237,000, filed July 16, 1951.

In this system of electrostatic storage, two identifiable states of charge (which may be referred to as 0 and 1 respectively) are produced upon defined digital storage areas, and can be regenerated. It is the object of the present invention to adapt the reading, writing and regenerating techniques of these known methods of storage to the storage of numerical quantities, where the number of different quantities that may have to be stored is greater than two, the quantities being in the radix notation with any desired base; for example numerical quantities in decimal notation or numerical quantities in other scales such as the bi-quinary as well as quantities in sterling and in various systems of weights and measures.

According to the present invention, the quantity is stored, read and regenerated by producing with the aid of the cathode ray beam on the insulating screen a characteristic state of charge at a selected region whose distance, along the track of the beam, measured from a reference point, is representative of the quantity, the the characteristic state of charge being substantially different from that at any region engaged by the cathode ray beam in a subsequent reading operation during the travel of the beam from the said reference point to the selected region, and applying a voltage generated in the signal plate during the reading operation to regenerate the said characteristic state of charge.

Thus digital data is stored by a method in which the position in space of an element of data which is recorded represents the magnitude of the digit to be recorded. In the case of the storage of numerical quantities in the decimal scale, each of the 10 discrete values 0–9 of any one digit may be recorded as an identifiable charge condition in an appropriate position, for example in one of 10 positions along a line. For the recording of any one particular value of a digit, a 0 or a 1 state of charge may thus be recorded in a desired position selected from an array of positions, the remaining positions preceding the said desired position along the track of an exploring cathode ray beam by which the quantity is to be read, having recorded thereon the alternative 1 or 0 state of charge, or an indeterminate state of charge.

The invention also provides an electrostatic storage system of the kind set forth comprising means for deflecting the cathode ray beam along a track over the screen from a reference point to bombard successive areas along the track, means for generating with the aid of the beam at a selected region along the track a characteristic state of charge which is substantially different from that at any of the said areas nearer the reference point than the said region, measured along the track, means for varying the position of the said region along the track in accordance with the quantity to be stored, such quantity being selectable from more than two different quantities, and means to apply a voltage generated in the signal plate to regenerate the characteristic state of charge.

Figure 2:
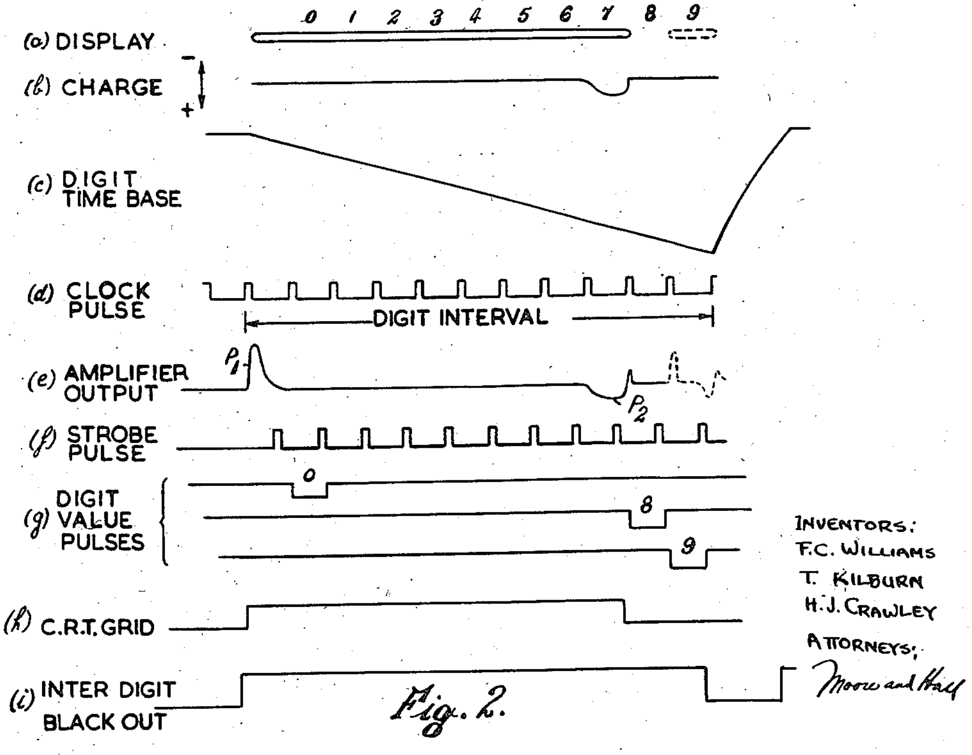
Figure 3:
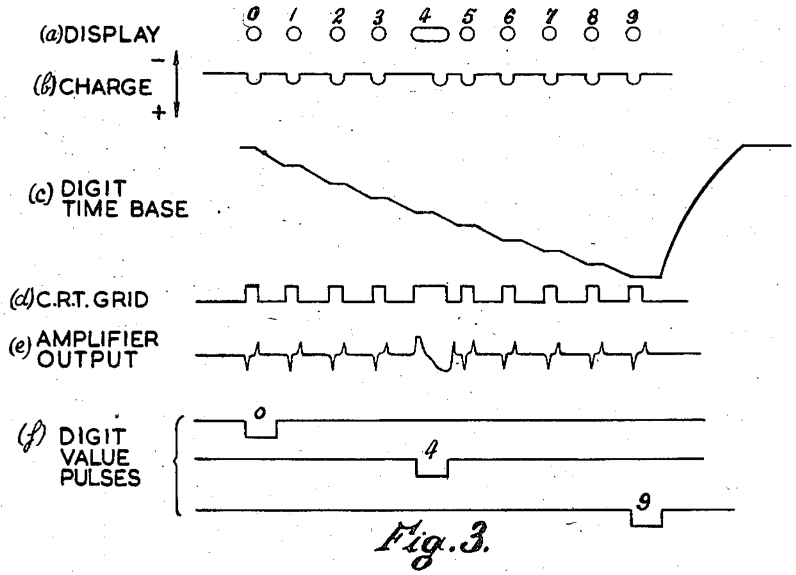
Figure 4:
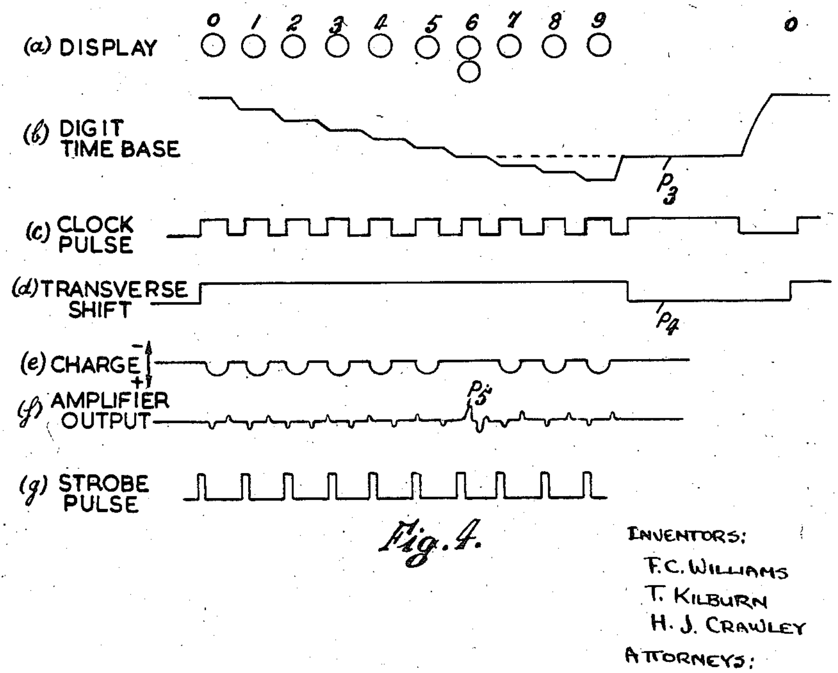
Figure 5:
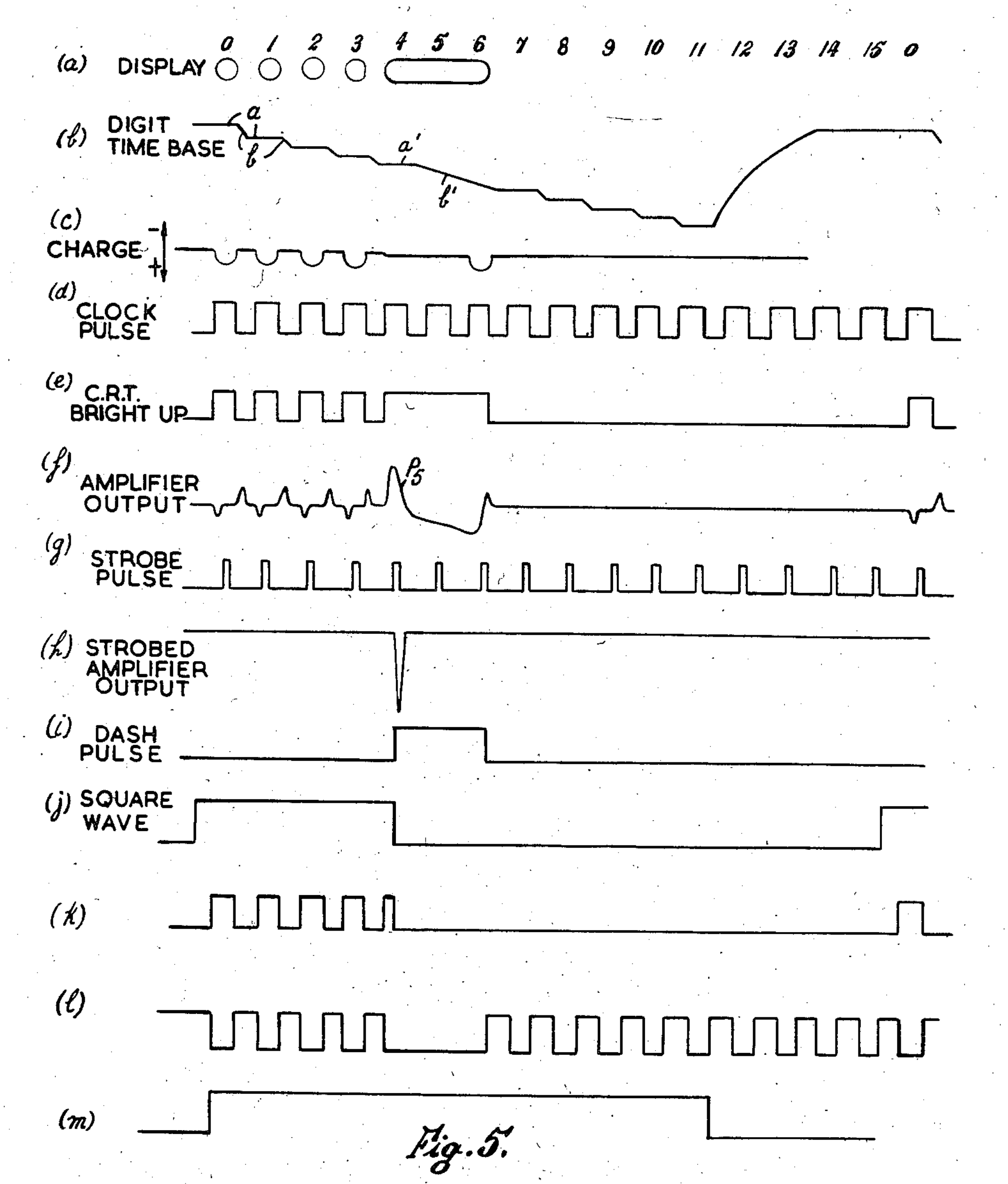
Figure 6:
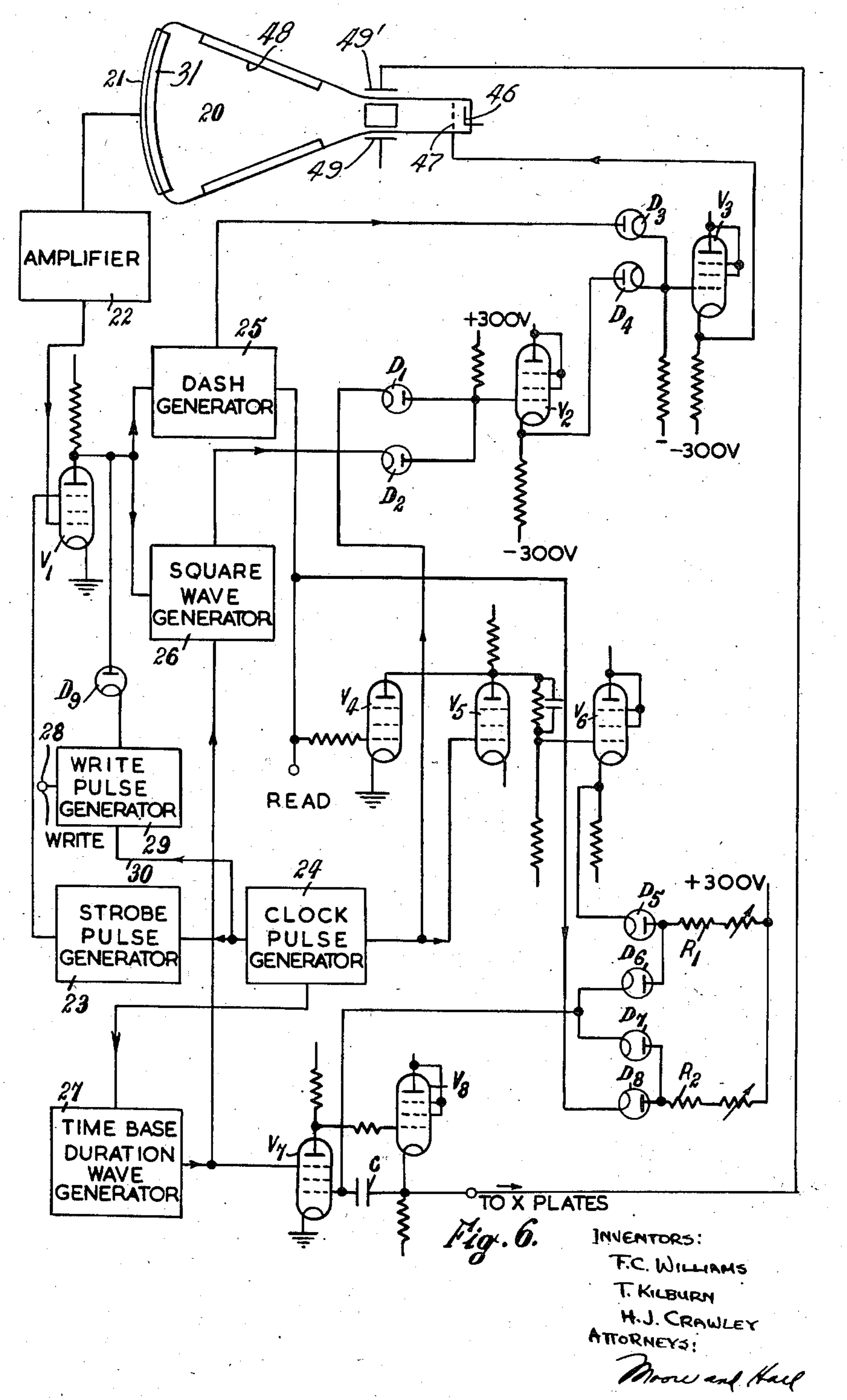
Figure 7:
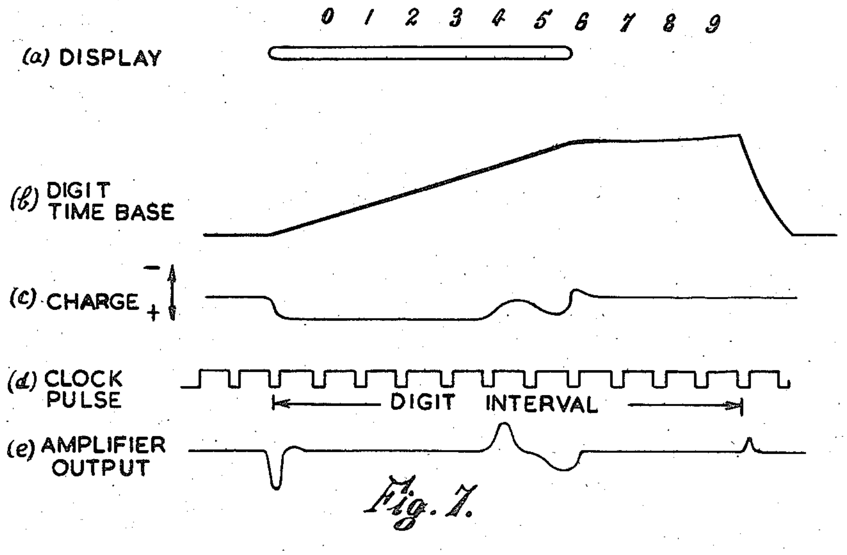
Figure 8:
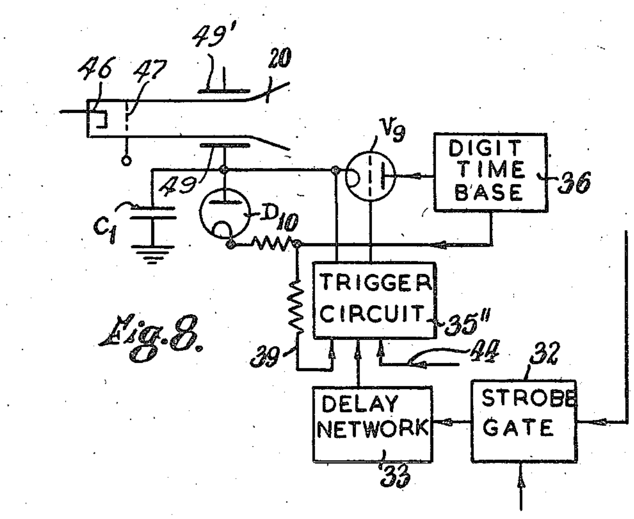
Figure 9:
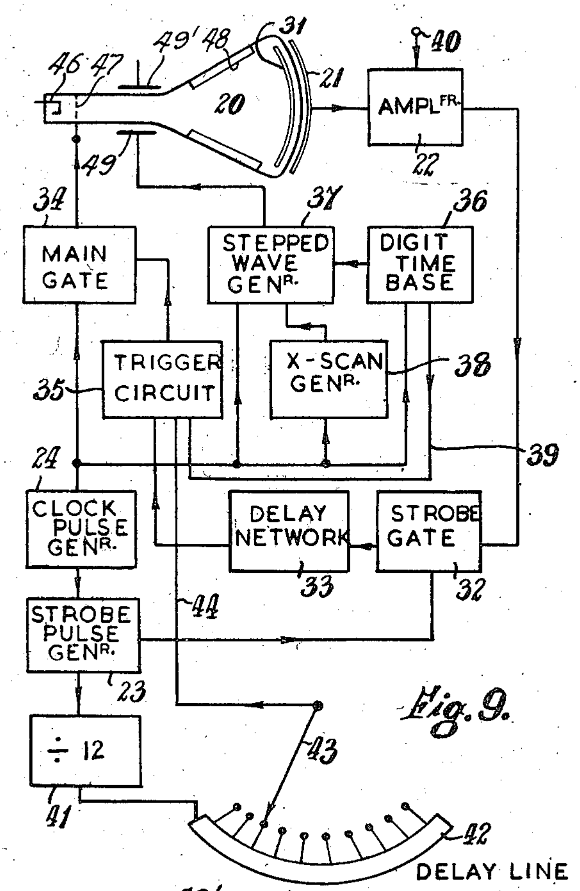
Figure 10:
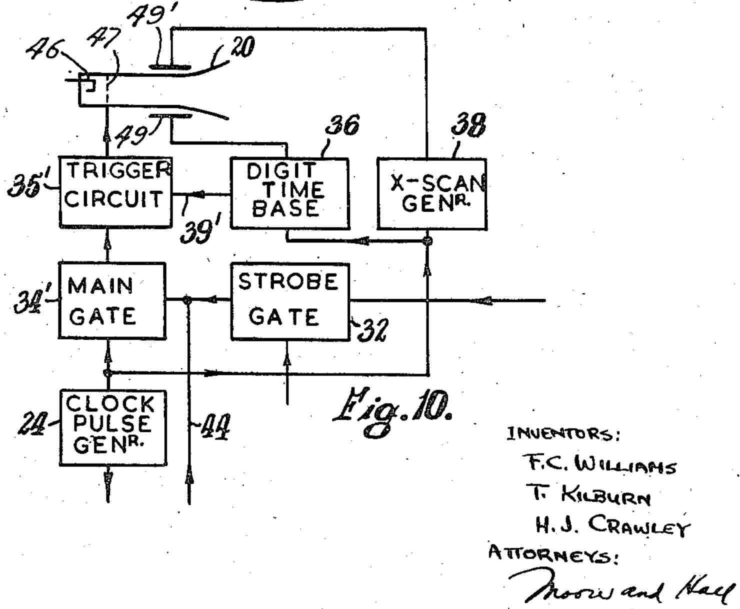

The invention will be described by way of example with reference to the accompanying drawings in which:

Figures 1 to 5 show waveform diagrams illustrating five different methods of operation according to the invention, Figure 6 is a circuit diagram of an arrangement operating in accordance with the method of Figure 5, Figure 7 shows other waveform diagrams, similar to Figures 1–5, illustrating another method of operation according to the invention, Figure 8 shows a modification of the diagram of Figure 9 for operation according to the method of Figure 7, Figure 9 is a block schematic diagram of apparatus operating in accordance with the method of Figure 1, Figure 10 shows a modification of the diagram of Figure 9 for operation according to the method of Figure 2.

A simple embodiment of the invention for storage of decimal information will be described with reference to a timing and waveform diagram shown in Figure 1 of the accompanying drawings. A short length of trace, Figure 1(*a*), on the cathode ray tube represents the area of storage surface allocated to the recording of one decimal digit. Each section of trace is of a length corresponding approximately to twelve spot diameters and will be separated from neighbouring lengths of trace by suitable intervals less than the critical spacing referred to in U. S. patent application Serial No. 50,136, filed September 20, 1948.

Ten of the spot positions along the trace correspond to the values 0 to 9, and are correspondingly numbered in Figure 1(*a*), and for reasons which will become apparent the first two spot positions A and B are "blank," that is without numerical significance. During the process of writing or reading a digit the cathode ray beam is caused to execute a scanning movement in step by step fashion over the section of trace, by a digit time base waveform as shown in Figure 1(*c*). The time interval involved in this scanning process may be referred to as the digit interval. At the end of the digit interval the beam will be caused to fly back to its starting point. The digit interval is defined by twelve positive-going pulses of a clock-pulse waveform, Figure 1(*d*), each pulse of which occurs and switches on the cathode ray beam during a constant voltage portion of the time base waveform, and has a duration sufficient to ensure that refilling of adjacent charge wells occurs.

Consider the operation of writing for the first time. The cathode ray beam is first directed to the first spot A in the array which is bombarded for the duration of a clock-pulse with the result that a well of positive charge is produced on the spot area. At the termination of the first clock-pulse the beam is stepped on by the digit time base waveform to the second spot position B which is then bombarded for the duration of the second clock-pulse. A well of positive charge is thus produced at the second spot position and as the spacing of the spots is within the critical value (1.33 spot diameters between centres) the well of positive charge at the first spot position is re-filled. At the end of the second clock-pulse interval the beam is stepped on to the third spot position C and the process is repeated until the spot location corresponding to the quantity to be recorded has been bombarded. In Figure 1 this is assumed to be 6 and this spot position is therefore shown in full line in Figure 1(*a*). Further illumination of the cathode ray beam is then prevented with the result that a well of positive charge remains at the last bombarded spot position as shown at Figure 1(*b*).

It will be apparent that if the cathode ray tube is provided with a signal plate feeding an amplifier in the manner described in the patent specification last referred to, then upon a subsequent step by step exploration of the charge pattern by the cathode ray beam, the signal plate output current will be of the form shown in Figure 1(*e*). During the first clock-pulse of the digit interval a positive pulse $P_1$ caused by the production of the initial positive charge well, will be produced. During subsequent clock-pulses a wave as shown will be produced by the combined effect of the production of positive charges at the bombarded spot, and the neutralisation by re-filling of the preceding positive charges. However, during bombardment of spot position 5 the output current wave from the signal plate will differ as shown due to the fact that positive charge wells in the two spot positions, namely 4 and 6, instead of only one, are re-filled. The signal current wave during the bombardment of position 5 will thus comprise a negative excursion $P_2$ larger than those occurring during any of the preceding bombardments and this large negative excursion can be identified by amplitude discrimination. It thus serves to indicate the quantity stored and can be used for re-generation by applying it to maintain the beam turned off for the portion of the digit period following the position 6. The intervals during which an examination for the occurrence of a large negative signal is carried out may be defined by a strobe pulse waveform as indicated at Figure 1(*g*). To avoid the need for an identification of the negative signal by amplitude discrimination the signal amplifier coupled to the signal plate may be given such a characteristic that the output signal wave form from the amplifier is smoothed whereby it is effectively as shown at Figure 1(*f*).

The reason for the provision of the two "blank" spot positions A and B of the commencement of the digit interval will now be apparent. If it is desired to record the quantity zero the first three spot positions will be bombarded and a positive well of charge will be left in the third position 0. When, therefore, the cathode ray beam is subsequently directed to the position B a large negative signal is generated because of the simultaneous re-filling at positions A and 0. If only one "blank" spot position B were provided at the commencement of the trace, then when the quantity 0 was recorded by the production of a positive charge well at the spot position representative of 0 it will be apparent that no large negative signal would be produced, as there would be re-filling only of one well, namely that at 0.

The cathode ray tube control circuit or gate circuit required to perform the operations of writing, reading and regenerating a charge pattern as described above may be substantially the gate circuit described in U. S. patent specification Serial No. 790,879, filed December 10, 1947. If the gate circuit were used in exactly the form described in the specification referred to with a clock-pulse waveform as indicated in Figure 1(*d*) then the turning on of the beam at the position 6 would be prevented. It is, however, at the position 7 that the turning-on of the beam is to be prevented. A delay must therefore be incorporated into the gate circuit whereby upon the detection of a negative signal by a strobe-pulse during one clock-pulse, black-out of the cathode ray beam is produced during the next but one clock-pulse.

A circuit operating in accordance with Figure 1 is shown in Figure 9. A cathode ray tube 20 has a cathode 46, control grid 47, collector electrode 48, deflecting plates 49 and 49′, an insulating recording surface 31 and a signal plate 21 coupled through an amplifier 22 to a strobe gate circuit 32. A strobe pulse generator 23 controlled by a clock pulse generator 24 selects from the amplifier output arriving at the gate 32 a part of the negative-going signal $P_2$ of Figure 1 and passes this through a delay network 33 to a main gate 34. The main gate 34 is normally open to pass clock-pulses to the grid of the tube 20 to switch on the cathode ray beam but is closed when a pulse is applied from 32 and 33. The delay introduced by the network is equal to one clock pulse period. Bombardment of the positions 8 and 9 which would be produced by the gate circuit so far described is, however, not necessary, and from the point of view of interference is undesirable. There may therefore be provided in the control connection to the main gate 34 a trigger circuit 35 which when actuated serves to hold the gate 34 closed and so back out the beam until the circuit is re-set.

The cathode ray beam is deflected by a voltage applied to deflecting plate 49 and generated by digit time base generator 36 suitably combined in a stepped waveform generator 37 with a triangular waveform generated from the clock-pulses and of the same frequency as these pulses to produce the waveform of Figure 1(*b*). On this is superimposed a stepped sawtooth voltage from an X time-base generator 38 controlled from the clock-pulse generator 24 and serving to provide a stepped sawtooth waveform each step being suitable to deflect the beam from a position corresponding to the start of the one digit area to that corresponding to the start of the next digit area in a line. The trigger circuit 35 may be re-set by the fly-back part of the digit time-base waveform occurring at the end of the digit interval and applied by a lead 39 or by any other means prior to the scanning of the next digit location.

The waveform of the voltage at the output of the trigger circuit 35 corresponding to re-generation of the quantity 6 is indicated in Figure 1(*h*). A digit time-base black-out waveform, for instance as shown in Figure 1(*i*), will also be provided to ensure that the cathode ray beam is blacked out during the inter-digit interval. The waveform shown may be applied to the control grid 47 of the cathode ray tube.

There is also indicated in Figure 9 the way in which information can be written into the storage device. For this purpose a suitable voltage is applied at a terminal 40 to cut off the current in a valve of the amplifier 22 and so interrupt the regenerative loop circuit between the signal plate 21 and the control grid 47 of the cathode ray tube 20. Pulses from the strobe generator 23 are applied to a frequency dividing circuit 41 which produces pulses having one twelfth the recurrence frequency of the strobe pulses. The pulses from 41 are applied to one end of a delay line 42 having ten tappings. At these tappings there are therefore generated pulses whose times of occurrence correspond with the digits 0 to 9 respectively. By setting the switch 43 associated with the delay line 42 to the desired digit, there is applied to the trigger circuit 35 by lead 44 a pulse which actuates this circuit at the appropriate time.

It will of course be understood that the switch 43 will normally be of the electronic type.

The system as described with reference to Figures 1 and 9 employs the first significant spot position for the recording for the digit of value 0. It will be apparent that if the first significant spot position is employed for the recording of the digit value one and the last spot position marked 9 is reserved for the digit value 0 then the extinction of the cathode ray beam by the digit time-base black-out waveform will automatically record 0 and no external signal representative of the value 0 need be provided. Such an arrangement may have advantages under certain circumstances in which it is desired that a signal in the form of a clock-pulse of approprite timing should be provided as a read output signal from the gate circuit only to represent the values one to nine, no signal being provided to represent zero.

A simpler mode of operation according to this invention is one using a modification of the so-called anticipation pulse or gap-trace method of recording described in the specification of U. S. pat. appln. Serial No. 790,879, filed December 10, 1947. In this method according to the present invention, the position and time of occurrence of a gap in a trace is determined by a clock-pulse and the position of the gap defines the quantity recorded. Figure 2 is a timing and waveform diagram illustrative of such a system employed for the recording of a decimal digit; in this example the digit 8 is chosen. A linear section of trace, Figure 2(*a*), is allocated to the recording of one decimal digit, and a digit time-base waveform, Figure 2(*c*), is provided to produce a uniform deflection along the line, the digit interval being divided into 11 portions by negative-going clock-pulses, Figure 2(*d*). It will be apparent that, if a gap coincident with a negative-going clock-pulse is inserted in the trace to produce a charge distribution of the form indicated in Figure 2(*b*), re-exploration of such a gapped trace will produce an amplifier output waveform as indicated in Figure 2(*e*), a negative anticipation pulse $P_2$ being produced during the negative-going clock-pulse preceding the gap. This negative anticipation pulse is examined by a strobe pulse waveform, Figure 2(*f*), and is utilised to release the succeeding negative-going clock-pulse to cause black-out of the exploring cathode ray beam, and thus to produce regeneration of the recorded charge pattern. The timing of pulses indicative of the magnitude of a digit will therefore be as indicated in Figure 2(*g*), in which are shown the pulses representing 0 and 9 as well as that representing 8.

As in the previous case described, it will be apparent that illumination of the trace following the gap is not necessary, and may even be undesirable. A trigger circuit may, therefore, be arranged to extend the effect of the released clock-pulse, as indicated in Figure 2(*h*) for the digit 8, until bright-up of the tube for the subsequent digit interval (controlled by the inter-digit black-out waveform, Figure 2(*i*)) is required. Similarly, it may be advantageous to utilise the first gap position (defined by the second clock-pulse of the digit interval) to represent the magnitude 1 instead of 0 as shown in Figure 2, and to use the last gap position (defined by the 11th clock-pulse of the digit interval) for the magnitude 0. It will be apparent that it is sufficient in this case for the digit time-base waveform to embrace only 10 clock-pulses, because black-out of the tube during fly-back commencing with the 11th clock-pulse of a digit interval will result in the anticipation pulse signal being derived during the 10th clock-pulse on a subsequent exploration. It could be arranged, therefore, if desired, that no external signal is employed to signify zero.

This method differs from that described with reference to Figures 1 and 9 in that the digit time-base waveform is not stepped, in that the delay network 33 is not required, and in that the beam is arranged to be normally switched on. Figure 10 shows the modifications to Figure 9 for this method of operation, like parts having the same references as in Figure 9, a dash superscript being added when the parts have a modified function. When a pulse arrives from the strobe gate 32 or on lead 44 it opens the main gate 34′ and allows a clock-pulse from 24 to pass to a trigger circuit 35′ which is thus actuated to switch off the cathode ray beam. The trigger circuit holds the beam switched off until the end of the digit interval when the circuit is reset by a pulse on lead 39′.

A modified form of the invention, adapted for the recording of a decimal digit in a manner which makes use of a modification of the "dot-dash" method of storage described in the specification of co-pending U. S. patent application Serial No. 50,136, filed September 20, 1948, will be described with reference to Figure 3. In this method, the digit interval, namely a length of trace allocated to the storage of one digit, is divided into 10 portions, indicated by numbers 0 to 9 in Figure 3(*a*). A dot or a dash charge distribution may be stored on any of the 10 portions of the trace, as indicated in Figure 3(*b*), where a dot distribution is stored in all positions except 4 which has a dash distribution. The value of the digit recorded is indicated by the position along the trace at which a dash charge distribution is produced. A linear, or as shown in Figure 3(*c*) a dot-paused, time-base deflecting waveform is applied to produce scanning of the beam and it is arranged that dots are normally written into each one of the 10 positions. In order to record a digit, the dot in the appropriate position is transformed into a dash by the application of a correspondingly timed dash pulse to the gate circuit of the regenerative loop associated with the cathode ray tube. The cathode ray tube grid waveform appropriate to the recording of, for example, the digit value 4, will thus be as shown in Figure 3(*d*). The output signal obtained from the amplifier connected to the signal plate during a subsequent scan of the digit position will be as indicated in Figure 3(*e*) and the recorded pattern may be regenerated in the manner described in U. S. patent application Serial No. 50,136, filed September 20, 1948, with the aid of suitable strobe, dot and dash waveforms. The relative timing of the read output dash pulse (or digit value pulse), obtained from the gate circuit will be as shown in Figure 3(*f*) for the digits 0, 4 and 9, and will be indicative of the magnitude of the digit recorded.

This system, as described, will, of course, occupy a length of trace upon the cathode ray tube corresponding to ten normal binary digits. The digit interval will occupy a corresponding period of time and a time interval corresponding to one or more binary digits will be provided for fly-back of the digit time-base waveform.

A modification of the dot-dash method of Figure 3 which may result in some economy of space compared with that method is illustrated in the timing and waveform diagram of Figure 4 which relates to an arrangement for the recording of a decimal digit. Ten separate storage areas are provided, as indicated in Figure 4(*a*). The areas are quite distinct and separate, and any one may hold a 0 or a 1 (dot or dash) charge distribution. In writing a particular decimal digit, e. g. 6, ten dots are first written as shown in the upper row of Figure 1(*a*) using a stepped time base deflecting waveform, as in Figure 4(*b*), and a clock-pulse waveform as in Figure 4(*c*). The separation between adjacent dots is made greater than the critical value, so that re-filling of any dot from its neighbour does not occur, but not sufficient to accommodate a spot drawn out into a dash in the line direction as in the previous method.

After the writing of the tenth dot (in area representing 9), the cathode ray beam is flashed back by the part $P_3$ of the time-base waveform of Figure 4(*b*) to the neighbourhood of the dot position corresponding to 6, as shown, a small transverse deflection being simultaneously applied, by the part $P_4$ of the wave indicated in Figure 4(*d*). The charge on the dot position 6 is thus converted to the dash form by re-filling from the adjacent spot, leaving the charge distribution shown in Figure 4(*e*). On a subsequent exploration the amplifier output signal is as in Figure 4(*f*) and a positive pulse $P_5$ is obtained when the dot position 6 is bombarded. The occurrence of this positive pulse may operate, through a conventional gate circuit controlled by a strobe pulse wave of the form indicated in Figure 4(*g*), to release a clock-pulse of corresponding timing. A counter circuit controlled by this clock-pulse may be employed to determine the height of the portion $P_3$ in Figure 4(*b*), and hence the position to which the beam is caused to fly back by the digit time-base waveform in order to regenerate the dash charge distribution on the area representing the digit 6.

If with the system just described it is desired to obtain, as an output signal representative of a digit value a clock-pulse which commences accurately at the leading edge of a pulse of the clock-pulse waveform, the read output pulse from the gate circuit (which obviously will have its leading edge late with respect to the clock-pulse waveform) may be employed to control a readily realisable circuit which will release the next pulse in the clock-pulse waveform to constitute the digit value read output signal to be passed to external equipment. The cathode ray beam will then be required to be flashed back, for the purpose of dot-refilling, one dot position more than the position defined by the digit-value defining clock-pulse. It may also be convenient to arrange that refilling of the dot in the first position of the array of dots corresponds to the digit value 1; the absence of any digit value signal (digit value 0) can then easily be arranged to result in no flash-back of the cathode ray beam during the period of transverse shift so that the last (10th) dot is automatically re-filled to produce the dash charge condition.

Another method according to the invention will be described with reference to the timing and waveform diagram of Figure 5. This method is a further modification of the method illustrated in Figure 3 but has the advantage over that method that great economy of space and time is obtained, since space and time for the writing of a dash is required at only one digit value position. In this method, provision is made for recording only dot charge distributions at all but one of a number of positions along the trace as indicated in Figure 5(*a*) and for the recording of a dash distribution only at one position which is indicative of the digital magnitude to be recorded. In Figure 5 this magnitude is assumed to be 4. The method thus resolves itself into the writing of dots at successive positions until the appropriate position is reached at which the dot is drawn out into a dash. As shown in Figure 5, this result is obtained by applying a digit time-base deflecting voltage wave (Figure 5(*b*)) of stepped form to cause the beam to remain stationary at the parts *a* and to move abruptly from each poisition to the succeeding position at the parts *b*, the cathode ray beam being switched on all the time (black-out may be provided during the transitions *b* if desired) and modifying the time-base deflecting waveform by the production, beginning after the part *a'* at the magnitude 4, of a linear, or substantially linear, sloping portion *b'* to cause extension of the dot. Following the extension of the dot into a dash, the digit time-base waveform may continue its stepped movement by the use of the time-base waveform of Figure 5(*b*), or it may be caused to flash back to its zero position, producing a charge distribution as shown in Figure 5(*c*). The time of dwell on each dot may be short, say 1 microsecond, sufficient only for the digging of a positive charge well, and the duration of the sloping portion *b'* of the digit time-base waveform will require to be sufficiently long, say 4 microseconds, to produce effective re-filling. The total time of recording a decimal digit can therefore be 10 digging times + one filling time + one flash-back time. This may be, say $$10\times 1\ \mu\text{sec.}+1\times 4\ \mu\text{sec.}+1\ \mu\text{sec.}$$

or, say, 15 $\mu$sec. per digit. It will be noted that this permits a considerable saving of time over methods in which provision is made for re-filling at each position, which requires on the same basis as assumed above 51 $\mu$sec. It also permits a considerable saving over methods in which a decimal digit is represented by means of the necessary four binary digits using standard dot/dash technique, which occupies approximately 40 $\mu$sec.

A schematic arrangement of a gate circuit, or regenerative loop circuit, and digit time-base generating circuit, for carrying out the method just described, is illustrated in Figure 6 and will be described with reference to the timing and waveform diagram of Figure 5.

It is assumed that in order to accommodate the dash re-filling and the fly-back time of the digit time-base an interval of 16 clock-pulses marked 0–15 in Figure 5(*a*), is allocated to a digit. Each of the constant voltage or "paused" portions *a* of the time-base waveform of Figure 5(*b*) corresponds to one positive-going clock-pulse (Figure 5(*d*)) the portions *a* being connected by rapid run down portions *b* while the constant voltage portion *a'* corresponding to the clock-pulse representative of the magnitude 4 to be recorded is followed by a relatively slow run down portion *b'* extending over two clock-pulses, which has the function of producing the dash charge distribution. The bright-up waveform of Figure 5(*e*) to be applied to the grid of the cathode ray tube comprises positive-going bright-up pulses coincident with the clock-pulses, the bright-up pulse indicative of the magnitude 4 to be recorded being extended into a dash pulse. Bright-up during subsequent clock-pulses in the digit interval is unnecessary and is therefore prevented.

There is shown in Figure 6 a cathode ray tube 20 having its signal plate 21 connected to the input of the amplifier 22. The output from the amplifier during a regenerating scan of the charge distribution of Figure 5(*c*) is as shown in Figure 5(*f*) and is fed to the control grid of a gate valve $V_1$, the suppressor grid of which receives the strobe pulse wave shown in Figure 5(*g*) from the strobe pulse generator 23 maintained in step with a clock-pulse generator 24. A portion of the relatively large positive peak $P_5$, which is obtained during the exploration of the initial dot portion of the dash charge distribution is selected by the strobe pulse to produce a negative-going pulse at the anode of $V_1$, as shown in Figure 5(*h*), which triggers a dash pulse generator 25 and a square wave generator 26. The dash pulse generator 25 produces a positive-going rectangular pulse, as shown in Figure 5(*i*), of approximately 4 microseconds duration, which may be utilised as the read output from the gate circuit. The square wave generator 26, which may be any suitable trigger circuit, produces a voltage waveform as shown in Figure 5(*j*), which is normally at zero or a positive value but which goes to a negative value on the occurrence of the negative output from the gate valve $V_1$ and remains at this value until the circuit is reset to produce the zero or positive output voltage at the commencement of the following 0 clock-pulse interval (or back edge of clock-pulse 15). The resetting of the generator 26 may be effected by the back edge of the positive-going pulse in Figure 5(*m*) generated in a time base duration generator 27 which is kept in step with the clock-pulse generator 24. An input writing signal may be applied to a terminal 28 to trigger a write pulse generator 29 which then generates a pulse such as that in Figure 5(h). This pulse is made of desired timing with respect to the clock-pulses by clock-pulse voltage fed on a lead 30. The negative pulse from 29 is fed through a diode $D_9$ to the anode of $V_1$.

To provide the requisite waveform for the cathode ray tube control grid 47, the output from the clock-pulse generator 24 and the output from the square wave generator 26 are combined in a circuit comprising diodes $D_1$, $D_2$ and a cathode follower $V_2$ to produce the waveform indicated in Figure 5(*k*) and this waveform is combined with the dash pulse waveform from 25 in a circuit comprising diodes $D_3$, $D_4$ and a cathode follower $V_3$. The output waveform from $V_3$ is the required cathode ray tube grid bright-up waveform, as shown in Figure 5(*e*).

The digit time-base generator is of the Miller run-down type and is shown schematically as comprising the valve $V_7$ with Miller capacitor C, a cathode follower $V_8$ being included in the feedback path to speed up the recovery time. The cathode of $V_8$ is connected to the X-deflecting plate 49'. The run-down speed of the time-base voltage wave is required to have one of three values, zero (or approximately zero) during the pauses *a* (Figure 5(*b*)) during clock-pulses, a relatively fast run-down during the intervals *b* between clock-pulses and a relatively slow run-down *b'* during the dash pulse. These three speeds are obtained by providing two alternative leaks $R_1$ and $R_2$ feeding current to the Miller capacitor for the two run-down speeds at *b* and *b'*, both leaks being disconnected when the pauses *a* are required. The leaks are switched by diode gates $D_5$, $D_6$ and $D_7$, $D_8$. The output of the dash pulse generator 25 and the clock-pulse waveform from 24 are combined, inverted and limited in valves $V_4$ and $V_5$ and produce at the cathode of $V_6$ the resultant wave, indicated at Figure 5(*l*), which is applied to the cathode of $D_5$. The dash pulse waveform is fed directly to the cathode of diode $D_8$. The result is that during all clock-pulses, except those occurring during the dash pulse, diodes $D_5$ and $D_8$ are conducting and diodes $D_6$ and $D_7$ are held cut off by the voltage drop across resistors $R_1$ and $R_2$ respectively with the result that the time-base voltage is prevented from running down. During intervals between clock-pulses, except those intervals occurring during the dash pulse, diode $D_5$ is cut off and diode $D_6$ is conducting to connect the leak $R_1$ producing the rapid run-down. During the dash pulse diode $D_8$ is cut off and diode $D_7$ is conducting to connect the leak $R_2$ producing the requisite slower speed run-down. The timing of the fly-back of the time-base is controlled by the square wave of Figure 5(*m*) from the time-base duration generator 27. The square wave which is applied to the suppressor grid of $V_7$ goes positive at the beginning of clock-pulse period 0 (or the back edge of clock-pulse 15) and goes negative to initiate the fly-back at the end of clock-pulse 11. Alternatively, as scanning subsequent to the end of the dash pulse in any digit period is unnecessary, the generator 27 may be controlled to produce a square wave which is terminated (goes negative) at the end of the dash pulse.

In the arrangement described the cathode ray beam is turned off during its movements between adjacent positions and gives rise to the amplifier output waveform indicated in Figure 5(*f*). Time has thus to be allowed for the positive "cloud pulse" signals to decay each time before the beam is again turned on. If the circuit is modified so that the cathode ray beam remains turned on from the commencement of clock-pulse 0 until the end of the dash pulse, the transitions in the time-base waveform may be made more rapid and only signals produced by the initial beam turn on and the scanning of the dash distribution will occur. Such a form of bright-up wave may be readily produced by a trigger circuit which is set by clock-pulse 0 and reset by the back edge of the dash pulse, for example substantially as described with reference to Figure 10.

In the method of recording described with reference to Figures 5 and 6, the separation between the centres of adjacent dots must be at least 1.33 *d*, where *d* is the spot diameter, so that the length of trace required for the recording of a decimal digit becomes $(9\times1.33\ d)+1$ dash length$+0.33\ d$, which is approximately 15 *d*. It will be noted that this represents about the same space as is occupied in the recording of 4 binary digits in the normal dot/dash method in which each digit requires a length of trace of at least 4 *d*.

It will be obvious that those methods of recording described above which are based essentially upon the dot-dash system of recording can be modified to employ the methods of recording employing high-frequency modulation described in the specification of co-pending U. S. pat. applications Nos. 205,459, filed January 11, 1951, and now Patent No. 2,642,550, issued June 16, 1953, and 237,000 filed July 16, 1951.

In a further method of recording, the principles of which are illustrated in the timing and waveform diagram of Figure 7, the possibility exists of utilising a shorter length of trace upon the cathode ray tube screen, and a shorter time-interval, in comparison with the methods previously described, for the recording of a given quantity. In this method, the cathode ray beam remains turned on for the whole digit interval, and a digit time-base waveform, Figure 7(*b*), is applied to deflect the beam at such a speed that re-filling of the excavated charge pattern behind the moving beam does not occur. This rapid scan is stopped at a position corresponding to the digital magnitude to be recorded and thus produces the trace indicated in Figure 7(*a*). At the end of the trace a partial re-filling of the preceding section of trace occurs, as indicated by the resulting charge distribution shown in Figure 7(*c*). The digit time-interval is defined by 11 pulses of the clock-pulse waveform shown in Figure 7(*d*) and a positive excavating signal in the amplifier output waveform, Figure 7(*e*), derived during a particular clock-pulse interval (say the 6th from the beginning of the digit interval, as shown) indicates that the cathode ray beam deflection has to be stopped during the succeeding clock-pulse period to record the magnitude 5. A standard gate circuit of the anticipation pulse type is suitable for the operation of this form of the invention, and a read output pulse derived from the gate circuit is utilised, in order to regenerate stored information, and to clamp the digit time-base at its own trailing edge, or at the leading edge of the succeeding clock-pulse. The position in a digit interval of the read output pulse obtained will represent the magnitude of the digit recorded.

One circuit for use with the form of the invention described with reference to Figure 7 is shown in Figure 8 as a modification of Figure 9. The digit time-base circuit 36 generates the waveform of Figure 7(*b*) and applies this through a valve $V_9$, biased to be normally conducting, to a deflecting electrode of the cathode ray tube 20 and to charge a condenser $C_1$. A trigger circuit 35'' is connected between grid and cathode of the valve $V_9$ to render the valve insulating when the trigger is operated. The trigger is operated either by a regeneration pulse from the strobe gate 32 or by a writing pulse along lead 44. A resetting pulse is generated in the digit time-base 36 at the commencement of fly-back and serves to reset the trigger through lead 39 and also to drive the cathode of a diode $D_{10}$ negatively and render the otherwise insulating diode conducting and thereby discharge the condenser $C_1$.

The effect of this circuit is to deflect the beam in the tube 20 whilst charging the condenser $C_1$ and when the trigger circuit 35'' is operated further increase in voltage of the condenser $C_1$ is prevented and the deflecting voltage remains at a value determined by the charge on the condenser $C_1$ until the condenser is discharged at the beginning of the fly-back stroke. A delay network 33 is included for the same reason as in Figure 9.

Particular reference has been made hitherto to recording in the decimal scale. As already stated the invention is applicable to recording in other scales and, by way of example, reference will be made to recording in the bi-quinary scale. It will be assumed that decimal digits are to be recorded in the bi-quinary scale. In one area of trace there is recorded the magnitude 0 or 5 and in another area of trace there is recorded the magnitude 0, 1, 2, 3 or 4. Thus the number 3 is represented by 0 in the first area and 3 in the second and the number 7 is represented by 5 in the first area and 2 in the second.

The quantities may be recorded along a single trace and the first part may constitute the first-named area, on which the binary information (0 or 5) is recorded, whilst the remainder of the trace constitutes the second area containing the quinary information. Each of the two quantities may be recorded by one of the methods already set forth or, if preferred, only the quinary information may be recorded in this way and the binary information may be recorded as described in any of the earlier specifications referred to as for binary digits, the digits in the present case signifying 0 and 5 instead of 0 and 1.

A convenient way of reading the recorded quantity is to provide a time-base waveform adapted to sweep the beam first over the binary record and then over the quinary record. If the binary record represents 0, the sweep over the quinary record is arranged to follow directly upon the sweep over the binary record. If the binary record represents 5, the sweep over the quinary record is arranged to commence after a time interval equal to the time of sweeping over the quinary record.

A somewhat modified arrangement for reading a biquinary record in which a time-base waveform adapted to sweep the beam first over the binary and then twice over the quinary record is employed will be explained by a numerical example. Assuming that the number 3 is to be indicated, the binary number will be zero and the quinary will be 3. The beam is then arranged to be turned on during the first sweep over the quinary record and to be blacked out during the second sweep. The time taken from the beginning of the first sweep to the scanning of the charge at the fourth position along the quinary record (representing 3) will be read as 3 units. If now the digit to be read is 7, the beam may be blacked out during the first sweep, which represents a time of 5 units, and switched on for the next sweep which will add to the 5 units a further 2 units representing the time taken to reach the third position on the quinary record which represents the number 2.

In practice, digits are usually recorded upon a raster-like pattern of lines, and it is convenient for each digital display (decimal or other scale) to be arranged along the line direction. This implies that the digital time-base deflection employed in various methods of recording described and including a fly-back portion to return the cathode ray beam to its position at the beginning of each digit interval should be superimposed upon a digit-frequency stepped deflecting waveform, which directs the cathode ray beam to the initial position of each successive digit recording area at the commencement of each successive digit interval. In an alternative arrangement, each linear digital display is arranged transversely to the line direction. In such a case the digit time-base waveform may be applied between say the Y plates superimposed upon a waveform which has steps of constant voltage occurring at the line frequency, while the line time-base itself may comprise a stepped deflecting waveform which directs the cathode ray beam to the initial positions of each digit display, which would be spaced along the line at intervals of at least 1.33 spot diameters, this waveform being applied between the X plates.

Although in all the methods just described it has been assumed that the digital trace is rectilinear, there is no reason why this should necessarily be so. For example, the 10 or more separate positions corresponding to a digit could be arranged in a circular pattern, appropriate deflecting potentials or deflecting systems being provided to cause the cathode ray beam to traverse a circular path during a digit interval. Such an arrangement as this would have certain advantages in that it could be readily adapted for counting purposes.

We claim:

1. A method of storing numerical information selected from more than two different quantities which comprises moving a cathode ray beam from a reference point along a track over an electric charge-retaining surface to produce a first state of charge along said track, such first state of charge being selected from zero, positive and negative charge, producing at a distance from said reference point dependent upon the quantity to be stored a second state of charge different from said first state of charge, again moving the cathode ray beam from the said reference point along said track, generating a voltage when the beam passes from said first to said second state of charge and applying said voltage to regenerate said second state of charge.

2. A method according to claim 1, wherein said second state of charge is less positive than said first state of charge.

3. A method according to claim 2, comprising the steps of switching the cathode ray beam on and off at a number of regularly-spaced areas along said track representative of said quantity to be stored to produce positive charges upon all said areas and subsequently releasing secondary electrons to the last of said areas engaged by the beam to reduce the positive charge on the last-named area.

4. A method according to claim 2, comprising the steps of switching the cathode ray beam on and off at a number of regularly-spaced areas along said track representative of said quantity to be stored to produce positive charges upon all said areas and subsequently deflecting said beam to release secondary electrons from a region of said surface close to the last of said areas engaged by the beam to the last-named area to reduce the positive charge thereon.

5. A method according to claim 2, comprising maintaining the beam switched on whilst it is moved along said track over the said distance, the movement being at a speed sufficient to prevent at least complete neutralisation of the positive charge generated along said track behind the beam.

6. A method according to claim 1, wherein said second state of charge is more positive than said first state of charge.

7. A method according to claim 6, comprising the steps of switching the cathode ray beam on and off at a number of regularly-spaced areas along said track representative of said quantity to be stored to produce positive charges upon said areas and to at least partly neutralise such positive charges on all said areas except the last.

8. A method according to claim 6, comprising moving the beam along the track whilst switched on to produce a positive charge along the track and neutralise such charge behind the beam, and switching the beam off to produce the said second state of charge.

9. Electrostatic storage apparatus for storing numerical quantities selected from a number of such quantities greater than two, comprising a cathode ray tube, an electric charge-retaining recording surface in said tube, cathode ray beam producing means in said tube, means to deflect said beam along a track over said surface to generate a first state of charge along said track, means coupled to at least one of said means to control said beam to generate a second state of charge on said track, means to generate a number of control voltages greater than two, each of a different characteristic, means to apply quantities to be stored to said generating means to control the characteristic generated by said generating means and means to apply said voltages to said beam producing means to determine the distance along said track at which said second state of charge is generated.

10. Apparatus according to claim 9 comprising means coupled to said beam producing means to switch the beam recurrently on and off during said deflection.

11. Apparatus according to claim 9, comprising means coupled to said beam producing means to maintain said beam switched on during said deflection and for switching said beam off after traversal of said distance.

12. Apparatus according to claim 9 including a signal plate to derive a voltage from a change in the state of charge along said track and means coupling said signal plate and said control means to apply said voltage to control said cathode ray beam to regenerate said second state of charge.

13. Apparatus according to claim 9, comprising means coupled to said beam producing means to switch said beam on and off, means to deflect said beam in steps along said track, each two steps being separated by a pause during which said beam is substantially stationary while switched on, and each two steps being separated by a distance greater than the critical distance at which secondary electrons generated during one pause can pass to the part of the track engaged by the beam during the preceding pause, and means coupled to said beam producing and said deflecting means to increase the time for which the beam is switched in and to apply an additional deflection to said beam to produce said second state of charge.

14. Electrostatic storage apparatus for storing numerical quantities selected from a number of such quantities greater than two, comprising a cathode ray tube, an electric charge-retaining recording surface in said tube, cathode ray beam producing means in said tube, means to deflect said beam along a track over said surface to generate a first state of charge along said track, means coupled to said beam producing means to control said beam to generate a second state of charge on said track, means to generate a number of control voltages greater than two each of a different characteristic, means coupled to said generating means to apply quantities to be stored to control the characteristic generated by said generating means, and means to apply said voltages to said control means to determine the distance along said track at which said second state of charge is generated.

15. Electrostatic storage apparatus for storing numerical quantities selected from a number of such quantities greater than two, comprising a cathode ray tube, an electric charge-retaining recording surface in said tube, cathode ray beam producing means in said tube, means to deflect said beam along a track over said surface to generate a first state of charge along said track, means to generate a number of control voltages greater than two each of a different characteristic, means coupled to said generating means to apply quantities to be stored to control the characteristic generated by said generating means, and means to apply said voltages to said deflecting means to determine the distance along said track at which said second state of charge is generated.

16. Electrostatic storage apparatus for storing numerical quantities selected from a number of such quantities greater than two-comprising a cathode ray tube, an electric charge-retaining recording surface in said tube, cathode ray beam producing means in said tube means to deflect said beam along a track over said surface to generate a first state of charge along said track, and means to control said beam to generate a second state of charge on said track, said beam controlling means comprising means to generate two control voltages, means coupled to said generating means to apply quantities to be stored to control the characteristic of each of said control voltages, and means to apply said control voltages to said beam producing means and said deflecting means respectively to determine the distance along said track at which said second state of charge is generated.

References Cited in the file of this patent

UNITED STATES PATENTS

| | | |
|---|---|---|
| 2,034,704 | Nakashima et al. | Mar. 24, 1936 |
| 2,093,157 | Nakashima et al. | Sept. 14, 1937 |
| 2,241,809 | De Forest | May 13, 1941 |
| 2,405,238 | Seeley | Aug. 6, 1946 |
| 2,422,295 | Eaton | June 17, 1947 |
| 2,465,364 | Ferrar | Mar. 29, 1949 |
| 2,468,032 | Busignies | Apr. 26, 1949 |
| 2,548,789 | Hergenrother | Apr. 10, 1951 |
| 2,576,859 | Schroeder | Nov. 27, 1951 |
| 2,642,550 | Williams | June 16, 1953 |